(12) United States Patent
Yoshikawa et al.

(10) Patent No.: US 8,543,302 B2
(45) Date of Patent: Sep. 24, 2013

(54) GEAR SHIFT CONTROL APPARATUS FOR AUTOMATIC TRANSMISSION AND GEAR SHIFT CONTROL METHOD FOR AUTOMATIC TRANSMISSION

(75) Inventors: Masato Yoshikawa, Susono (JP); Norimi Asahara, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 423 days.

(21) Appl. No.: 13/056,211

(22) PCT Filed: May 15, 2009

(86) PCT No.: PCT/JP2009/059090
§ 371 (c)(1),
(2), (4) Date: Jan. 27, 2011

(87) PCT Pub. No.: WO2010/131367
PCT Pub. Date: Nov. 18, 2010

(65) Prior Publication Data
US 2011/0130931 A1 Jun. 2, 2011

(51) Int. Cl.
*G06F 7/00* (2006.01)
(52) U.S. Cl.
USPC .............................................. 701/55; 701/51
(58) Field of Classification Search
USPC ....................................................... 701/51, 55
See application file for complete search history.

(56) References Cited

U.S. PATENT DOCUMENTS

| 5,688,207 A * | 11/1997 | Uchida et al. ................. 477/155 |
| 2007/0037661 A1 * | 2/2007 | Yang ............................. 477/115 |
| 2008/0314196 A1 * | 12/2008 | Fukumoto et al. .............. 74/745 |
| 2010/0178637 A1 * | 7/2010 | Lecointre et al. ................ 434/29 |
| 2010/0197449 A1 * | 8/2010 | Imamura et al. .................. 477/3 |
| 2012/0108384 A1 * | 5/2012 | Tabata et al. ...................... 477/3 |

FOREIGN PATENT DOCUMENTS

| JP | 6 109112 | 4/1994 |
| JP | 2002 349688 | 12/2002 |

OTHER PUBLICATIONS

International Search Report issued Jun. 16, 2009 in PCT/JP09/59090 filed May 15, 2009.

* cited by examiner

*Primary Examiner* — Hussein A. Elchanti
(74) *Attorney, Agent, or Firm* — Oblon, Spivak, McClelland, Maier & Neustadt, L.L.P.

(57) ABSTRACT

A gear shift control apparatus for an automatic transmission includes: a gear-shift-state-determining unit for determining the presence or absence of a gear-shift-determination of the automatic transmission; a gear-shift-time-estimating unit, when there is the gear-shift-determination, for estimating gear-shift-completion-time since the present gear is shifted to another gear and, after that, further shifted to the present gear; a fuel-consumption-estimating unit for estimating a first fuel consumption in the case where the vehicle drives for the gear-shift-completion-time in the present gear and a second fuel consumption in the case where the present gear is shifted to another gear and, after that, further shifted to the present gear; and a fuel-consumption-determining unit for determining validity of the gear shift on the basis of fuel consumptions. A gear-shift-control unit changes the determination of shifting to another gear at the time of the gear-shift-determination in accordance with a determination result of the fuel-consumption-determining unit.

20 Claims, 6 Drawing Sheets

GEAR SHIFT CONTROL APPARATUS FOR AUTOMATIC TRANSMISSION AND GEAR SHIFT CONTROL METHOD FOR AUTOMATIC TRANSMISSION

FIELD

The present invention relates to a gear shift control apparatus for an automatic transmission and a gear shift control method for an automatic transmission. More particularly, the invention relates to a gear shift control apparatus for an automatic transmission and a gear shift control method for an automatic transmission, performing gear shift control of the automatic transmission having a plurality of gears of different gear ratios.

BACKGROUND

In a vehicle, a transmission of changing rotation of power transmitted from an engine and transmitting the resultant power to driving wheels is mounted. As the transmission, in recent years, an automatic transmission for automatically changing speed without a gear shift operation of the driver is often used. The automatic transmission is provided so that the gear can be shifted by a control apparatus for controlling the automatic transmission. Such an apparatus for controlling the gear shift of the automatic transmission performs a gear shift control on the automatic transmission by selecting a proper gear in accordance with driving conditions of a vehicle. In the case of selecting a proper gear in accordance with driving conditions of a vehicle, for example, a gear at which the fuel consumption is minimum in a present travel state is selected and the gear of the automatic transmission is shifted to the selected gear. It can improve fuel consumption at the time of travel of a vehicle.

However, in the case of performing the gear shift by selecting a gear at which the fuel consumption is the minimum as described above, the selected gear frequently changes according to an operation of an accelerator pedal or the like. Since the gear shift is frequently performed, there is the case that drivability deteriorates. Consequently, there is a conventional gear shift control apparatus for an automatic transmission, which suppresses frequent gear shifts in the gear shift control on the automatic transmission for the purpose of improvement in fuel consumption.

For example, a control apparatus for an automatic transmission described in patent literature 1 calculates a gear at which the fuel consumption becomes the minimum on the basis of an operation amount of an accelerator pedal and travel speed of a vehicle, does not shift the gear in a case where a difference between a fuel consumption in the present gear and a fuel consumption in the calculated gear is less than a predetermined threshold, and shifts the gear in a case where the difference of the fuel consumptions is equal to or larger than the predetermined threshold. With the technique, the gear can be shifted to the gear at which the fuel consumption can be reduced, and frequent gear shifts can be suppressed.

CITATION LIST

Patent Literature

Patent Literature 1: Japanese Patent Application Laid-open No. 6-109112

SUMMARY

Technical Problem

In the case of shifting the gear to a gear at which the fuel consumption can be reduced while suppressing frequent gear shifts, like the control apparatus for the automatic transmission described in the patent literature 1, by not performing the gear shift in the case where the difference between a fuel consumption in the present gear and a fuel consumption in the calculated gear as a gear at which the fuel consumption is the minimum is less than a predetermined threshold, frequent gear shifts can be suppressed. In consideration of the fuel consumption, it is more advantageous to decrease the threshold used for determination of whether the gear is shifted or not. However, in this case, the gear shift is performed frequently, so that drivability may deteriorate. At the time of shifting the gear, there is a case that the fuel consumption for reducing a gear shift shock at the time of gear shift increases. In this case, fuel consumption does not improve effectively.

On the other hand, in the case where the threshold used to determine whether the gear is shifted or not is made large in order to suppress frequent gear shifts, there is a case that the gear is not shifted even in a situation which is advantageous to shift the gear from the viewpoint of fuel consumption, so that the fuel consumption may deteriorate. As described above, it is difficult to satisfy both improvement in fuel consumption and suppression of deterioration in drivability caused by frequent gear shifts.

The present invention has been achieved in consideration of the above and an object of the invention is to provide a gear shift control apparatus for an automatic transmission and a gear shift control method for an automatic transmission, capable of realizing both improvement in fuel consumption and suppression of frequent gear shifts more reliably.

Solution to Problem

A gear shift control apparatus for an automatic transmission according to an aspect of the present invention, performing gear shift control on an automatic transmission provided so as to be able to output power of an engine as a power source at the time of driving of a vehicle to a driving wheel side and having a plurality of gears in which rotational speed of the power can be shifted, includes a gear shift control unit, in the case where a target gear as a gear which becomes a target at the time of performing the gear shift control is not a present gear, for controlling a gear shift by making a gear shift determination of shifting the gear from the present gear to another gear, a gear shift state determining unit for determining the presence or absence of the gear shift determination, a gear shift time estimating unit, in the case where there is the gear shift determination, for estimating gear shift completion time as time after the gear is shifted from the present gear to the another gear until the gear is further shifted to the present gear, a fuel consumption estimating unit for estimating a first fuel consumption as a fuel consumption of the engine in the case where the vehicle travels for the gear shift completion time at the present gear without shifting the present gear and a second fuel consumption as a fuel consumption of the engine in the case where the gear is shifted from the present gear to the another gear and, further, shifted to the present gear, and a fuel consumption determining unit for determining validity of gear shift on the basis of the first and second fuel consumptions, wherein the gear shift control unit changes a determination of shifting the gear to the another gear at the time of the gear shift determination in accordance with a determination result of the fuel consumption determining unit.

Further, it is preferable that in the case where the fuel consumption determining unit determines that the second fuel consumption is larger than the first fuel consumption by a predetermined amount or larger, the gear shift control unit changes a determination of shifting the gear to the another gear at the time of the gear shift determination.

In addition, it is preferable that the gear shift control apparatus for an automatic transmission further includes a reset prediction determining unit, in the case where there is the gear shift determination, for making a determination of whether it is predicted that the present gear is shifted to the another gear and, after that, further shifted to the present gear or not on the basis of driving conditions of the vehicle, wherein in the case where the reset prediction determining unit determines that it is predicted that the present gear is shifted to the another gear and, after that, further shifted to the present gear, the gear shift time estimating unit estimates the gear shift completion time.

Further, it is preferable that the gear shift time estimating unit estimates the gear shift completion time by adding time required to shift the gear to time in the case where the vehicle travels in the another gear at the time of the gear shift determination.

In addition, it is preferable that the fuel consumption estimating unit estimates the second fuel consumption by adding a fuel consumption at the time of shifting the gear to a fuel consumption in the case where the vehicle travels in the shifted gear.

Further, it is preferable that the gear shift time estimating unit estimates the gear shift completion time in consideration of travel resistance when the vehicle travels.

A gear shift control method for an automatic transmission according to another aspect of the present invention, performing gear shift control on an automatic transmission provided so as to be able to output power of an engine as a power source at the time of driving of a vehicle to a driving wheel side and having a plurality of gears in which rotational speed of the power can be shifted, includes a gear shift state determining step, in the case where a target gear as a gear which becomes a target at the time of performing the gear shift control is not a present gear, of determining the presence or absence of the gear shift determination as a determination of shifting the gear from the present gear to the another gear, a gear shift time estimating step, in the case where there is the gear shift determination, of estimating gear shift completion time as time after the gear is shifted from the present gear to the another gear until the gear is further shifted to the present gear, a fuel consumption estimating step of estimating a first fuel consumption as a fuel consumption of the engine in the case where the vehicle travels for the gear shift completion time at the present gear without shifting the present gear and a second fuel consumption as a fuel consumption of the engine in the case where the gear is shifted from the present gear to the another gear and, further, shifted to the present gear, and a fuel consumption determining step of determining validity of gear shift on the basis of the first and second fuel consumptions, wherein a determination of shifting the gear to the another gear at the time of the gear shift determination is changed in accordance with a determination result of the fuel consumption determining step.

Further, it is preferable that in the case where it is determined in the fuel consumption determining step that the second fuel consumption is larger than the first fuel consumption by a predetermined amount or more, a determination of shifting the gear to the another gear at the time of the gear shift determination is changed.

In addition, it is preferable that a reset prediction determining step, in the case where there is the gear shift determination, of making a determination of whether it is predicted that the present gear is shifted to the another gear and, after that, further shifted to the present gear or not on the basis of driving conditions of the vehicle, wherein in the case where it is determined in the reset prediction determining step that it is predicted that the present gear is shifted to the another gear and, after that, further shifted to the present gear, the gear shift completion time is estimated in the gear shift time estimating step.

Further, it is preferable that in the case of estimating the gear shift completion time in the gear shift time estimating step, the gear shift completion time is estimated by adding time required to shift the gear to time in the case where the vehicle travels in the another gear at the time of the gear shift determination.

In addition, it is preferable that the second fuel consumption is estimated in the fuel consumption estimating step by adding a fuel consumption at the time of shifting the gear to a fuel consumption in the case where the vehicle travels in the shifted gear.

Further, it is preferable that in the gear shift time estimating step, the gear shift completion time is estimated in consideration of travel resistance when the vehicle travels.

Advantageous Effects of Invention

The gear shift control apparatus for an automatic transmission according to the present invention provides an effect such that both improvement in fuel consumption and suppression of frequent gear shifts can be realized more reliably. The gear shift control method for an automatic transmission according to the present invention provides an effect such that both improvement in fuel consumption and suppression of frequent gear shifts can be realized more reliably.

DESCRIPTION OF EMBODIMENTS

In the following, an embodiment of a gear shift control apparatus for an automatic transmission and a gear shift control method for an automatic transmission according to the present invention will be described in detail with reference to the drawings. The present invention is not limited by the embodiment. The components in the embodiment include a component which can be replaced by a person skilled in the art and is easy one or substantially the same.

Figure 1:
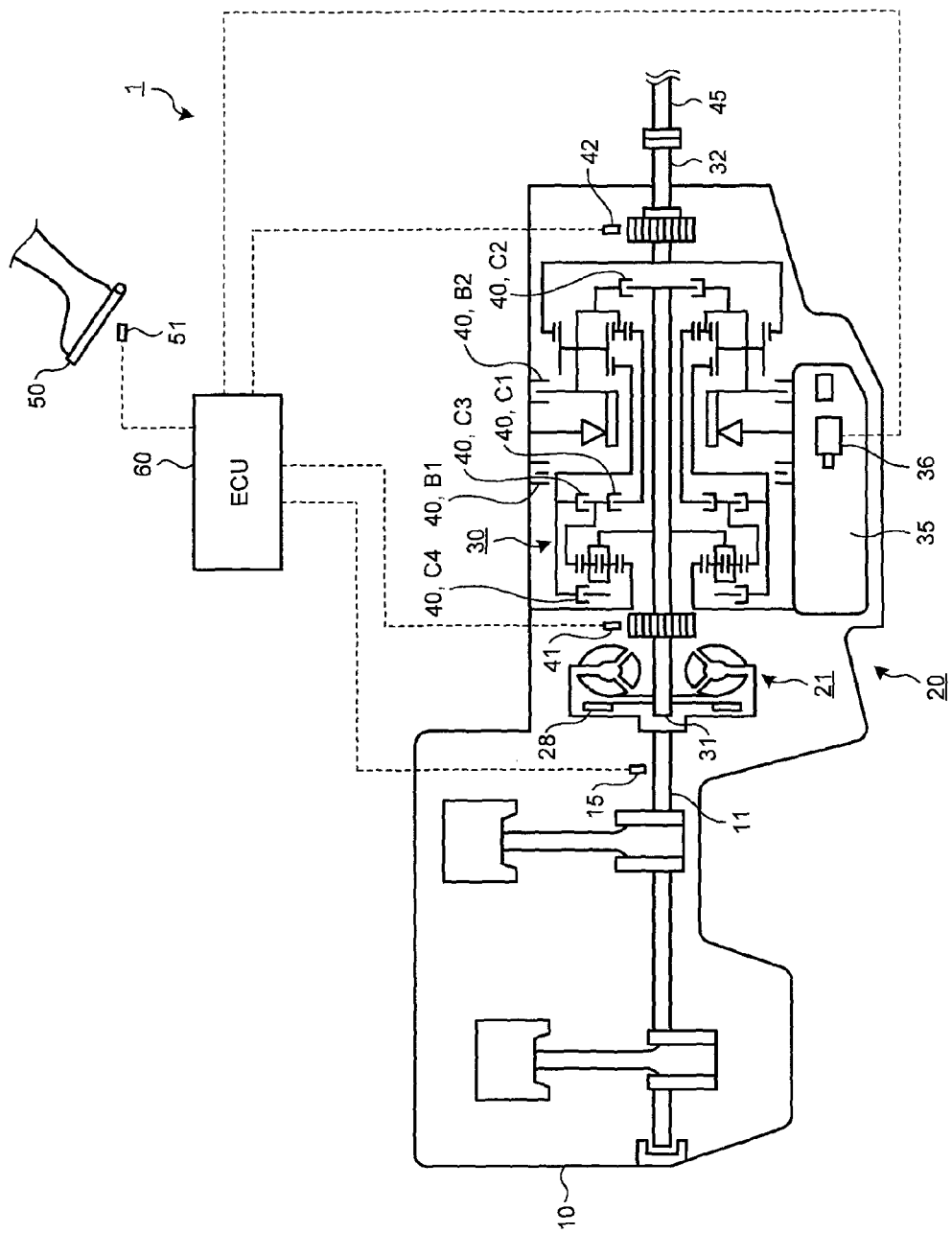
FIG. 1 is a schematic diagram of a gear shift control apparatus for an automatic transmission according to an embodiment of the invention.

FIG. 1 is a schematic diagram of a gear shift control apparatus of an automatic transmission according to an embodiment of the invention. In a gear shift control apparatus 1 shown in the diagram, gear shift control of an automatic transmission 20 mounted on a vehicle (not shown) can be performed. The automatic transmission 20 is connected to an engine 10 as a power source. The engine 10 is connected to an ECU (Electronic Control Unit) 60 and the rotational speed and torque (output) of the engine can be controlled by the ECU 60.

The automatic transmission 20 includes a torque converter 21, a transmission 30, and a hydraulic control unit 35. Power generated by the engine 10 and supplied to the automatic transmission 20 can be transmitted to the transmission 30 as transmission gear ratio varying means via the torque converter 21. In the case where the power of the engine 10 is transmitted to the transmission 30, the rotational speed is changed at a selected transmission gear ratio according to the driving conditions of the vehicle in the transmission 30. The changed torque can be output to the side of driving wheels (not shown) of the vehicle.

The transmission 30 of the automatic transmission 20 is a multi-gear transmission 30 constructed by combining a planetary gear device made of a plurality of transmission elements and a plurality of friction elements 40 (clutches C1, C2, C3, and C4 and brakes B1 and B2). The brake is the friction element 40 attached to the casing of the transmission 30. The clutch is the friction element 40 attached to the rotary shaft, not to the casing of the transmission 30. The number of transmission elements and the friction elements 40 of the transmission 30 may be properly changed according to the specifications of the automatic transmission 20.

A hydraulic control unit 35 has a linear solenoid valve 36 as hydraulic adjusting means for a friction element for adjusting the hydraulic pressure of control oil supplied to each of the friction elements 40. The hydraulic control unit 35 can generate a hydraulic pressure for operating each of the friction elements 40, and has a function of distributing the generated hydraulic pressure to a predetermined friction element 40 and adjusting the hydraulic pressure of control oil supplied to the friction element 40. The automatic transmission 20 is provided with a pump (not shown) connected to the linear solenoid valve 36 and supplying control oil stored in the automatic transmission 20 to the linear solenoid valve 36.

The transmission 30 can change the transmission gear ratio by stopping the rotation elements (a carrier and a ring gear) of the planetary gear device as the transmission elements by the brakes B1, B2, and the like as the friction elements 40 and by switching the rotation element of the transmission 30 to which the power of the engine 10 is supplied by the clutches C1, C2, C3, C4, or the like as the friction elements 40. By changing the combination of the rotation elements to be stopped, the gear can be shifted. That is, the combinations of rotation and stop of the rotation elements are set as the gears of the automatic transmission 20, and the automatic transmission 20 has a plurality of gears by which the rotational speed of the power transmitted from the engine 10 can be changed.

Since the automatic transmission 20 is provided as described above, the power generated by the engine 10 is supplied to the transmission 30 in the automatic transmission 20 via the torque converter 21. The transmission 30 has a transmission output shaft 32 as an output shaft of the transmission 30, and the transmission output shaft 32 is connected to a propeller shaft 45 of the vehicle. That is, the transmission output shaft 32 is an output shaft of the automatic transmission 20.

The engine 10 is also provided with an engine rotational speed sensor 15 as engine rotational speed detecting means capable of detecting the rotational speed of an engine output shaft 11. The automatic transmission 20 includes a transmission input shaft rotational speed sensor 41 as transmission input shaft rotational speed detecting means capable of detecting rotational speed of a transmission input shaft 31, and a transmission output shaft rotational speed sensor 42 as transmission output shaft rotational speed detecting means capable of detecting rotational speed of the transmission output shaft 32.

The engine rotational speed sensor 15, the transmission input shaft rotational speed sensor 41, the transmission output shaft rotational speed sensor 42, and the linear solenoid valve 36 are connected to the ECU 60. Further, to the ECU 60, an accelerator position sensor 51 as accelerator position detecting means mounted near an accelerator pedal 50 provided for a driver's seat of the vehicle and capable of detecting the accelerator position as the position of the accelerator pedal 50 is connected.

Figure 2:
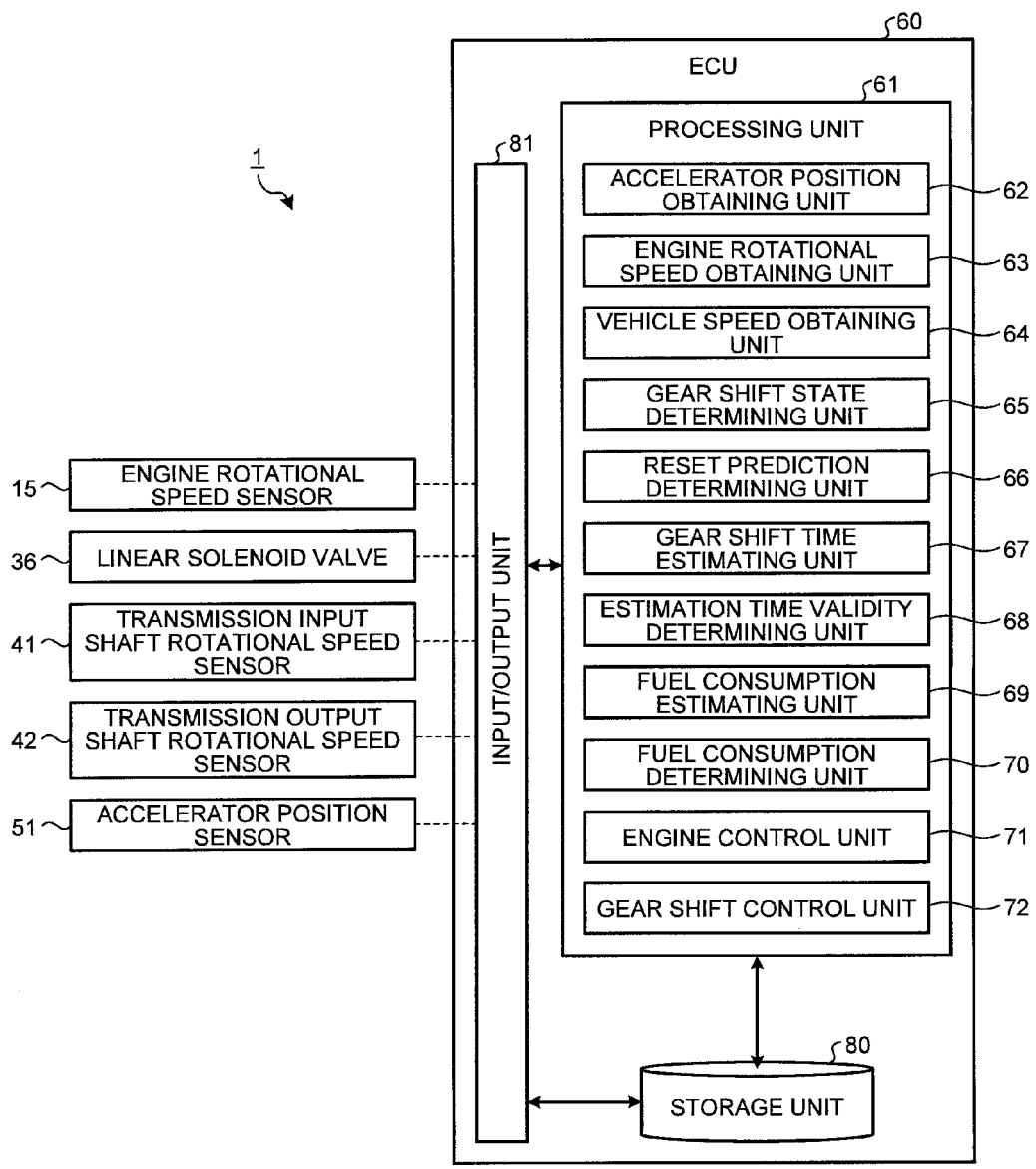
FIG. 2 is a configuration diagram of a main part of the gear shift control apparatus for the automatic transmission shown in FIG. 1.

FIG. 2 is a configuration diagram of a main part of the gear shift control apparatus for the automatic transmission shown in FIG. 1. The ECU 60 includes a processing unit 61, a storage unit 80, and an input/output unit 81 which are connected to each other and can transmit/receive signals to/from each other. The engine rotational speed sensor 15, the linear solenoid valve 36, the transmission input shaft rotational speed sensor 41, the transmission output shaft rotational speed sensor 42, and the accelerator position sensor 51 are connected to the input/output unit 81 in the ECU 60. The input/output unit 81 transmits/receives signals to/from the engine rotational speed sensor 15 and the like. In the storage unit 80, a computer program for controlling the gear shift control apparatus 1 of the automatic transmission 20 is stored.

The processing unit 61 is constructed by a memory and a CPU (Central Processing Unit) and includes at least: an accelerator position obtaining unit 62 as accelerator position obtaining means capable of obtaining the accelerator position as the position of the accelerator pedal 50 from a detection result of the accelerator position sensor 51; an engine rotational speed obtaining unit 63 as engine rotational speed obtaining means for obtaining engine rotational speed from a detection result of the engine rotational speed sensor 15; and a vehicle speed obtaining unit 64 as vehicle speed obtaining means for obtaining vehicle speed from a detection result in the transmission output shaft rotational speed sensor 42.

The processing unit 61 also has: a gear shift state determining unit 65 as gear shift state determining means for determining the presence or absence of a gear shift determination as a determination to shift the gear of the transmission 30; a reset prediction determining unit 66 as reset prediction determining means, in the case where the gear shift state determining unit 65 determines the presence of a gear shift determination, for changing the present gear to another gear and, further, determining whether or not it is predicted that the gear is shifted to the present gear on the basis of the driving conditions of the vehicle; a gear shift time estimating unit 67 as gear shift time estimating means, in the case where the gear shift state determining unit 65 determines the presence of a gear shift determination, for estimating gear shift completion time as time since the present gear is shifted to another gear and, after that, further shifted to the present gear; and an estimation time validity determining unit 68 as estimation time validity determining means for determining whether the gear shift completion time estimated by the gear shift time estimating unit 67 is valid or not.

The processing unit 61 also has: a fuel consumption estimating unit 69 as fuel consumption estimating means for estimating a fuel consumption in operation of the engine 10 on the basis of the driving conditions of the vehicle and, when the reset prediction determining unit 66 determines that the present gear is predicted to be shifted to another gear and, further, shifted to the present gear, estimating a first fuel consumption as a fuel consumption of the engine 10 in the case where the vehicle drives for the gear shift completion time at the present gear without changing the present gear and a second fuel consumption as a fuel consumption of the engine 10 in the case where the present gear is shifted to another gear at the time of the gear shift determination during driving of the vehicle and, after that, shifted the present gear; and a fuel consumption determining unit 70 as fuel consumption determining means for comparing the first and second fuel consumptions estimated by the fuel consumption estimating unit 69 and determining whether the second fuel consumption is larger than the first fuel consumption by a predetermined amount or not.

The processing unit 61 also has: an engine control unit 71 as internal combustion engine control means for performing driving control of the engine 10; and a gear shift control unit 72 as hydraulic control means for controlling a hydraulic pressure acting on the friction elements 40 in the automatic transmission 20, thereby enabling the gear shift control of the automatic transmission 20 to be performed.

The gear shift control apparatus 1 of the automatic transmission 20 controlled by the ECU 60 is controlled, for example, in such a manner that the processing unit 61 loads the computer program into a memory assembled in the processing unit 61, performs arithmetic operation and, according to a result of the arithmetic operation, operates the linear solenoid valve 36 or the like. At this time, the processing unit 61 stores a numerical value during the arithmetic operation into the storage unit 80, reads the stored numerical value, and executes arithmetic operation. In the case of controlling the gear shift control apparatus 1 of the automatic transmission 20 as described above, the control may be performed by dedicated hardware different from the ECU 60 in place of the computer program.

The gear shift control apparatus 1 of the automatic transmission 20 according to the embodiment has the configuration as described above and its operation will be described below. During the driving of the vehicle, a stroke amount or accelerator position of the accelerator pedal 50 is detected by the accelerator position sensor 51 provided near the accelerator pedal 50. The detection result of the accelerator position sensor 51 is transmitted to the accelerator position obtaining unit 62 of the processing unit 61 in the ECU 60, and is obtained by the accelerator position obtaining unit 62. The accelerator position obtained by the accelerator position obtaining unit 62 is transmitted to the engine control unit 71 of the processing unit 61 in the ECU 60, and the engine control unit 71 controls the engine 10 on the basis of the transmitted accelerator position and detection results of the other sensors.

The power of the engine 10 controlled by the engine control unit 71 is output to the outside by rotation of the engine output shaft 11. The rotation of the engine output shaft 11 is first transmitted to the torque converter 21 to rotate the torque converter 21 and is transmitted to the transmission input shaft 31 via the torque converter 21.

The rotation of the engine output shaft 11 transmitted to the transmission input shaft 31 via the torque converter 21 is transmitted to the transmission 30 by the transmission input shaft 31. In such a manner, the power of the engine 10 is supplied to the transmission 30.

The rotational speed and the magnitude of the torque of the power of the engine 10 supplied from the transmission input shaft 31 to the transmission 30 via the torque converter 21 are changed by the transmission elements of the transmission 30, and the resultant power is output from the transmission output shaft 32 of the transmission 30. Since the transmission output shaft 32 is connected to the propeller shaft 45 of the vehicle, the output from the transmission 30 is transmitted to the driving wheels of the vehicle via the propeller shaft 45 and, in addition, power transmitting means disposed between the automatic transmission 20 and the driving wheels. Accordingly, the drive wheels rotate, and the vehicle travels.

During the travel of the vehicle, the gear shift control unit 72 of the processing unit 61 in the ECU 60 controls the automatic transmission 20 and performs gear shift control in accordance with the driving conditions of the vehicle. Specifically, when the vehicle travels, the engine rotational speed sensor 15 detects rotational speed of the engine output shaft 11, and the detection result is transmitted to the engine rotational speed obtaining unit 63 of the processing unit 61 in the ECU 60 and is obtained by the engine rotational speed obtaining unit 63. When the vehicle travels, the transmission output shaft rotational speed sensor 42 detects the rotational speed of the transmission output shaft 32. Since the gear ratio of the transmission output shaft 32 and that of the driving wheels are constant, by detecting the rotational speed of the transmission output shaft 32, the rotational speed of the driving wheels can be estimated and, accordingly, the vehicle speed can be estimated. Consequently, the transmission output shaft rotational speed sensor 42 is provided as vehicle speed detecting means capable of detecting vehicle speed by detecting the rotational speed of the transmission output shaft 32. The rotational speed of the transmission output shaft 32 detected by the transmission output shaft rotational speed sensor 42 is transmitted to the vehicle speed obtaining unit 64 of the processing unit 61 in the ECU 60. By performing a predetermined arithmetic operation in the vehicle speed obtaining unit 64, the rotational speed is obtained as vehicle speed.

The gear shift control unit 72 makes the friction elements 40 such as the clutch C1 operate by operating the linear solenoid valve 36 in accordance with the accelerator position obtained by the accelerator position obtaining unit 62, the engine rotational speed obtained by the engine rotational speed obtaining unit 63, the vehicle speed obtained by the vehicle speed obtaining unit 64, and the like, and changes the gear ratio by switching between engagement and disengagement of the friction elements 40 and switching between rotation and stop of the rotary elements of the planetary gear device to shift the gears.

In the case of performing the gear shift control in the gear shift control unit 72, the gear is selected on the basis of the accelerator position or the like and shifted. However, depending on the driving conditions of the vehicle, there is a case that the present gear is shifted to another gear and, after that, the present gear is selected again and the another gear is shifted to the present gear. Consequently, in the case where it is predicted that the present gear is shifted to another gear and, after that, shifted again to the present gear, the gear shift control apparatus 1 of the automatic transmission 20 according to the embodiment determines whether the gear is shifted or not on the basis of the fuel consumption in the case where such gear shift is performed and the fuel consumption in the case where the gear change is not performed and, controls the gear shift.

Figure 3:
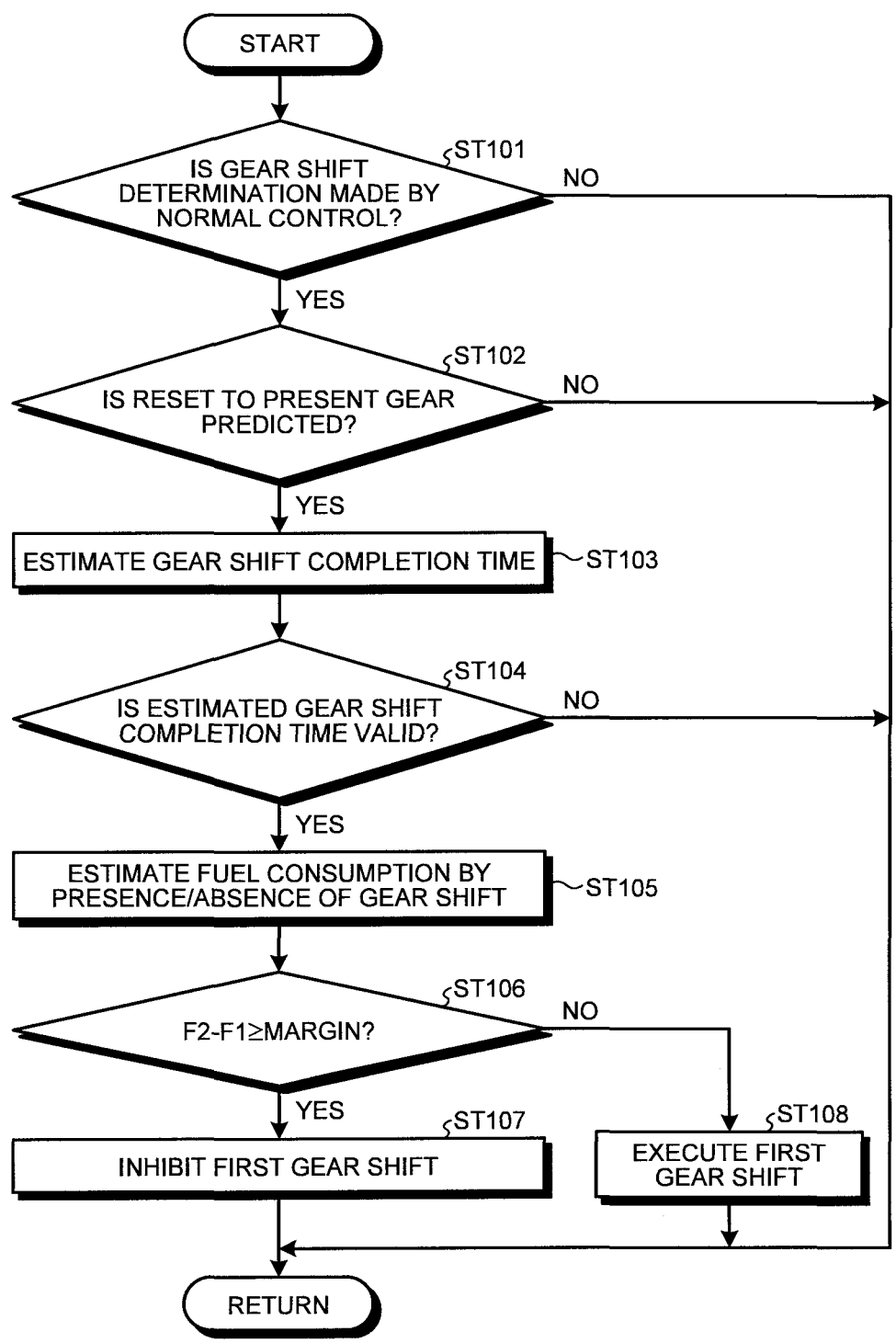
FIG. 3 is a flowchart showing a procedure of the gear shift control apparatus for the automatic transmission according to the embodiment.

FIG. 3 is a flowchart showing a procedure of the gear shift control apparatus of the automatic transmission according to the embodiment. Next, a control method of the gear shift control apparatus 1 of the automatic transmission 20 according to the embodiment, that is, the procedure of the gear shift control apparatus 1 will be described. Specifically, the procedure at the time of selecting the gear of the transmission 30 by the gear shift control apparatus 1 of the automatic transmission 20 according to the embodiment will be described. The following processes are called every predetermined period and executed at the time of controlling the components at the time of driving the vehicle.

In the procedure of the gear shift control apparatus 1 of the automatic transmission 20 according to the embodiment, first, whether there is a gear shift determination by normal control or not is determined (step ST101). The determination is performed by the gear shift state determining unit 65 by detecting the control state of the transmission 30 in the gear shift control unit 72 of the processing unit 61 in the ECU 60 by the gear shift state determining unit 65 of the processing unit 61 in the ECU 60. Usually, in the case where the gear shift control unit 72 performs gear shift control of the transmission 30, the driving conditions of the vehicle such as the accelerator position obtained by the accelerator position obtaining unit 62, the rotational speed of the engine 10 obtained by the engine rotational speed obtaining unit 63, and the vehicle speed obtained by the vehicle speed obtaining unit 64 are obtained, and the gear adapted to the obtained driving conditions is selected.

In the case of selecting the gear at the time of the gear shift control of the transmission 30 by the gear shift control unit 72, for example, a map showing gear shift timings by gears each for the accelerator position and the vehicle speed is preliminarily set and stored in the storage unit 80 in the ECU 60. By putting the accelerator position and the vehicle speed into the map, the gear is selected. Alternatively, a map showing the relation between the rotational speed and the torque of the engine 10 at which the fuel consumption is optimum is preliminarily set and stored in the storage unit 80 in the ECU 60. By putting the rotational speed of the engine 10 and the torque of the engine 10 estimated from the accelerator position or the like into the map, the driving conditions of the engine 10 at which the fuel consumption is optimum are derived, and the gear at which the driving conditions can be realized is selected. By selecting the gear in such a manner, the gear shift control unit 72 selects the gear adapted to the obtained driving conditions and sets the selected gear to a target gear as a gear to be achieved at the time of performing the gear shift control by the gear shift control unit 72.

The gear shift control unit 72 makes a gear shift determination that, in the case where the target gear is not the present gear, the gear is shifted from the present gear to the target gear as another gear. The gear shift state determining unit 65 makes a transmission state determination of whether such a gear shift determination is made or not by detecting the control state of the gear shift control unit 72. In the case where it is determined by the gear shift state determining unit 65 that the gear shift determination by normal control is not made, the program exits from the procedure.

On the contrary, in the case where it is determined that the gear shift determination by normal control is made in the determination (step ST101) by the gear shift state determining unit 65, whether it is expected that the gear is reset to the present gear or not is determined (step ST102). The determination is made by the reset prediction determining unit 66 of the processing unit 61 in the ECU 60. In the case that the gear is shifted from the present gear to the target gear by performing the gear shift control on the transmission 30 by the gear shift control unit 72, the reset prediction determining unit 66 determines whether it is expected that the gear is shifted again to the present gear or not on the basis of the driving conditions of the vehicle such as the accelerator position and the vehicle speed. Specifically, in the case where the present gear is g0, the target gear is g1, gear shift from g0 to g1 is a first gear shift, gear shift from the shifted gear g1 again to g0 is a second gear shift, the reset prediction determining unit 66 makes a reset prediction determination that, in the case where the first gear shift is performed, whether it is predicted that the second gear shift is performed or not on the basis of the accelerator position and the vehicle speed.

For example, in the case where the first gear shift is a so-called kickdown of shifting the gear to a gear lower than the present gear by sharply increasing the accelerator position, the gear is shifted to the lower gear by making the first gear shift. After that, when it is predicted that the vehicle speed becomes higher by the gear shift and the second gear shift is made by shifting the gear to the gear on the high-speed side, the determination is made that it is predicted that the gear is reset to the present gear. Also in the case where the first gear shift is a so-called "off-up" of shifting the gear to a gear higher than the present gear as a request driving force which is requested by the driver decreases by decreasing the accelerator position during acceleration, the gear is shifted to a higher gear by making the first gear shift. After that, when the driving force decreases due to the gear shift and the vehicle speed becomes lower and it is predicted that the second gear shift is made by shifting the gear to the gear on the low-speed side, the determination is made that it is predicted that the gear is reset to the present gear. That is, the control of the gear shift control apparatus 1 of the automatic transmission 20 according to the embodiment is applied to both of the case where the target gear g1 is a gear higher than the present gear g0 and the case where the target gear g1 is a gear lower than the present gear g0.

In the case of performing such prediction by the reset prediction determining unit 66, the driving state at a gear after performing the first gear shift is predicted by using the map showing the gear shift timing used for selecting the gear in the gear shift control unit 72, the map showing the driving conditions at which the fuel consumption is optimum, and the like. That is, the presence or absence of a gear shift in the case where g1 is shifted and the driving is continued at the present acceleration position is predicted. In the case where it is predicted that the driving is continued at the present acceleration position after the gear is shifted to g1, it is predicated that a gear different from g1 is selected. In the case where the gear is g0, the reset prediction determining unit 66 predicts that the gear is reset to the present gear. When a determination is made that it is not predicted that the gear is not reset to the present gear, the program exits from the procedure.

When the reset prediction determining unit 66 determines that a reset to the present gear is predicted (step ST102), the gear shift completion time is estimated (step ST103). The gear shift estimation which is estimation of the gear shift completion time is performed by the gear shift time estimating unit 67 of the processing unit 61 in the ECU 60. In the case where the gear shift time estimating unit 67 estimates gear shift completion time as time of a shift, after the gear is shifted from g0 to g1, again to g0, acceleration after the first gear shift is performed, that is, acceleration after the gear is shifted to g1 is calculated by the acceleration position and the vehicle speed, and required time to become the timing of the gear shift to g0 in the case where the vehicle travels at the acceleration is calculated. That is, in the determination (step ST102) by the reset prediction determining unit 66, at the time of determining whether reset to the present gear is predicted or not, when reset to the present gear is predicted, since vehicle speed at the time of gear shift can be also derived from the map of the gear shift timing or the like, the gear shift time estimating unit 67 calculates required time to reach the vehicle speed as the gear shift timing from g1 to g0 in the case where the vehicle travels at the acceleration after the gear is shifted to g1.

Further, at the timing of gear shift to g0 and shifting the gear from g1 to g0, the gear shift time estimating unit 67 calculates time required to complete the gear shift from g1 to g0 by adding the time required for the gear shift itself of the gear to the required time. By the calculation, the gear shift time estimating unit 67 estimates, as the gear shift completion time, time required to complete the second gear shift in the case of performing the first gear shift and further performing the second gear shift.

Next, whether the estimated gear shift completion time is valid or not is determined (step ST104). The determination is made by the estimation time validity determining unit 68 of the processing unit 61 in the ECU 60. The estimation time validity determining unit 68 compares the gear shift completion time estimated by the gear shift time estimating unit 67 with predetermined time which is preliminarily set as predetermined time used at the time of determining whether the gear shift completion time is valid or not and, in the case where the gear shift completion time is longer than the predetermined time, determines that the gear shift completion time is invalid.

For example, in the case where the time to complete the second gear shift is too long due to the fact such that the vehicle speed which becomes a gear shift timing in the gear shift from g1 to g0 is largely different from the present vehicle speed or the estimated acceleration is too low, it is predicted that the driver changes the accelerator position before the second gear shift completes. In the case where the vehicle speed which becomes a gear shift timing of gear shift from g1 to g0 exceeds legal speed, it is predicted that the driver resets the accelerator pedal 50 to the original position to decrease the accelerator position before the second gear shift completes. Therefore, in these cases, prediction of the gear shift itself is useless.

Consequently, the predetermined time used for the determination of whether the gear shift completion time is valid or not in the estimation time validity determining unit 68 is preliminarily set as time predicted as time in which the driver does not change the accelerator position until the second gear shift completes, and stored in the storage unit 80 in the ECU 60. In the case where the estimation time validity determining unit 68 determines that the gear shift completion time is not valid, the program exits from the procedure. At the time of making the determination of whether the estimated gear shift completion time is valid or not, the predetermined time to be compared with the gear shift completion time may be constant time or varied according to the driving conditions of the vehicle.

In the case where the estimation time validity determining unit 68 determines that the estimated gear shift completion time is valid (step ST104), next, the fuel consumption at the presence/absence of gear shift is estimated (step ST105). The estimation is performed by the fuel consumption estimating unit 69 of the processing unit 61 in the ECU 60. The fuel consumption estimating unit 69 estimates a first fuel consumption F1 as a fuel consumption of the engine 10 of the gear shift completion time estimated by the gear shift time estimating unit 67 (step ST103) in the case where the vehicle travels without shifting the present gear g0 and a second fuel consumption F2 as a fuel consumption for performing the first and second gear shifts until the second gear shift completes. The first and second fuel consumptions F1 and F2 are estimated on the basis of the map showing the driving conditions of the vehicle such as vehicle speed, accelerator position, engine rotational speed, and the like and the fuel consumption for each driving condition. The map is preliminarily set as a map indicative of the fuel consumption for the driving conditions of the vehicle or the operating state of the engine 10 and is stored in the storage unit 80 in the ECU 60.

Further, in the case of estimating the second fuel consumption F2, a decrease amount of thermal efficiency due to retard in ignition for suppressing a shock at the time of gear shift and a decrease amount of transmission efficiency of the power by the transmission 30 due to slippery, generation of heat, or the like of the friction elements 40 at the time of gear shift are converted as increase amounts in the fuel consumption at the time of shifting of the gear. The second fuel consumption F2 is estimated by adding the increase amount of the fuel consumption calculated as described above to the fuel consumption estimated on the basis of the driving conditions of the vehicle and the map, that is, the fuel consumption in the case where the vehicle drives in g1 as the gear shifted from the present gear g0. The fuel consumption estimating unit 69 performs the fuel consumption estimation of estimating the first and second fuel consumptions F1 and F2 in such a manner.

Next, whether the relation (F2−F1)≧margin is satisfied or not is determined (step ST106). The determination is made by the fuel consumption determining unit 70 of the processing unit 61 in the ECU 60. The fuel consumption determining unit 70 subtracts the first fuel consumption F1 as the fuel consumption in the case of maintaining the present gear g0 from the second fuel consumption F2 as the fuel consumption until the second gear shift completes, which is estimated by the fuel consumption estimating unit 69, and determining whether the calculated fuel consumption is equal to or larger than a predetermined margin or not. That is, the second fuel consumption F2 as a fuel consumption at the time of performing the first and second gear shifts includes an improved fuel consumption by the gear shift and a deteriorated fuel consumption accompanying the gear shift. Consequently, by comparing the second fuel consumption F2 with the first fuel consumption F1 as the fuel consumption in the case of maintaining the present gear g0, in the case where the gear is shifted, which one of the influence of the improved fuel consumption by gear shift and the influence of the deteriorated fuel consumption accompanying the gear shift is larger can be determined.

That is, it shows that the larger the result of (F2−F1) is, the larger the fuel consumption is in the case of shifting the gear, and that deterioration in fuel consumption accompanying the gear shift is large. On the contrary, the smaller the result of (F2−F1) is, in the case where the gear shift is performed, the smaller the fuel consumption is, and the larger the improvement in fuel consumption by the gear shift is. Consequently, this margin used for determination in the fuel consumption determining unit 70 is preset as the difference in the fuel consumptions accompanying the presence/absence of a gear shift, which can determine that the gear shift is valid because, when it is predicted that the first and second gear shifts are performed, in the case of performing the gear shift, improvement in fuel consumption is large, and the improved amount in fuel consumption is large, and stored in the storage unit 80 in the ECU 60. In other words, the fuel consumption determining unit 70 makes a fuel consumption determination of determining validity of the gear shift on the basis of the first and second fuel consumptions F1 and F2. The margin used for the determination in the fuel consumption determining unit 70 may be a preset constant value or a value which varies according to the driving conditions of the vehicle.

When it is determined that the relation (F2−F1)≥margin is satisfied by the determination (step ST106) in the fuel consumption determining unit 70, the first gear shift is inhibited (step ST107). That is, in the case where it is determined that (F2−F1) is equal to or larger than the predetermined margin, it is determined that the improved amount in fuel consumption by performing the first and second gear shifts is small, and it is more advantageous from the viewpoint of fuel consumption to maintain the present gear than the case of performing the first and second gear shifts. Consequently, in this case, the gear shift control unit 72 inhibits the first gear shift as a shift from the present gear g0 to another gear g1. Concretely, the target gear subjected to the gear shift control in the gear shift control unit 72 is rewritten from g1 to g0. By the operation, the target gear becomes g0 which is the present gear, so that unless the accelerator position changes, the present gear g0 is maintained at least until time estimated that the second gear shift completes in the case of performing the first and second gear shifts. The gear shift control unit 72 changes the determination of shifting the gear to another gear g1, which is made at the time of the gear shift determination, in accordance with a determination result of the fuel consumption determining unit 70. That is, in the case where the fuel consumption determining unit 70 determines that the second fuel consumption F2 is larger than the first fuel consumption by a predetermined amount or more, the gear shift control unit 72 changes the determination of shifting the gear to another gear g1, which is made at the time of the gear shift determination, and inhibits the first gear shift.

On the contrary, when the fuel consumption determining unit 70 determines that the relation (F2−F1)≥margin is not satisfied (step ST106), the first gear shift is executed (step ST108). That is, in the case where it is determined that (F2−F1) is less than the margin, it means that it is determined that the improved amount in fuel consumption by performing the first and second gear shifts is small, and it is more advantageous from the viewpoint of fuel consumption to perform the first and second gear shifts than the case of maintaining the present gear g0. Consequently, in this case, the gear shift control unit 72 performs the gear shift control without changing the target gear g1. The gear shift control unit 72 performs the first gear shift from the present gear g0 to g1, after that, sets the target gear to g0, and performs the second gear shift from g1 to g0.

Figure 4:
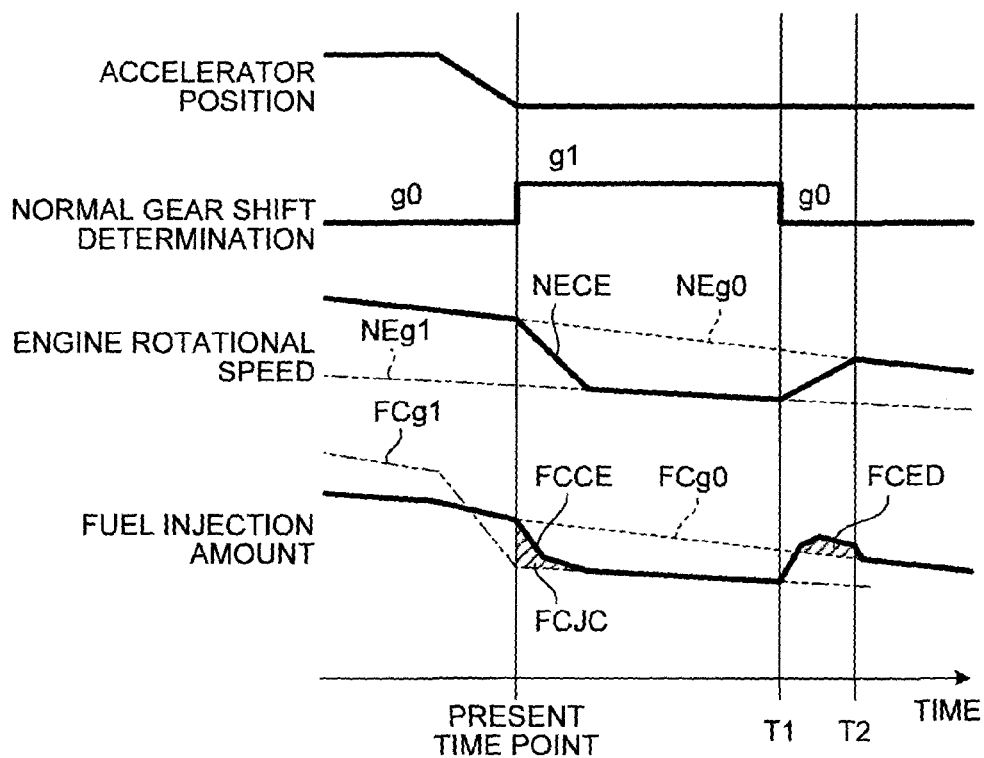
FIG. 4 is an explanatory diagram showing changes in a fuel injection amount in the case of executing first and second gear shifts and the case of maintaining the present gear.

FIG. 4 is an explanatory diagram showing changes in a fuel injection amount in the case of executing first and second gear shifts and the case of maintaining the present gear. When it is predicted that the second gear shift is performed after the first gear shift in the case where the gear shift control is performed in the gear shift control unit 72, whether the gear shift is performed or not is determined on the basis of the fuel consumption as described above. Next, changes in the fuel injection amount in the case of performing the first and second gear shifts and in the case of maintaining the present gear g0 will be described. The following description relates to the case where down shift is performed after off-up as an example of the case where the second gear shift is performed after the first gear shift.

In the case where the accelerator pedal 50 is set to the original position during travel of the vehicle to decrease the force on the accelerator pedal, the opening of a throttle valve (not shown) provided for the engine 10 becomes smaller, and the fuel injection amount also decreases. Consequently, the engine rotational speed decreases. In the case where the force on the accelerator pedal is decreased, when it is determined to shift the gear of the transmission 30 from the present gear g0 to g1 as a gear higher than g0 in a normal gear shift determination of the gear shift control unit 72, the gear shift control unit 72 shifts the gear from g0 to g1. That is, the first gear shift is executed. When the gear is shifted from g0 to g1 in this manner, the engine rotational speed decreases.

Although the engine rotational speed changes according to the vehicle speed and the gear, since g1 is a gear higher than g0 and the speed reducing ratio of g1 is lower than that of g0, as the engine rotational speed in the case where the vehicle speed in the gear g0 and that in the gear g1 are the same, g1 engine rotational speed NEg1 as the engine rotational speed when the gear is g1 is lower than g0 engine rotational speed NEg0 as engine rotational speed when the gear is g0. Therefore, engine rotational speed NECE upon execution of gear shift as engine rotational speed in the case of shifting the gear from g0 to g1 is the same as the g0 engine rotational speed NEg0 before the gear shift. After the gear shift to g1, the engine rotational speed NECE upon execution of gear shift decreases toward the g1 engine rotational speed NEg1 and becomes the same as the g1 engine rotational speed NEg1. At that time, the engine rotational speed NECE upon execution of gear shift gradually decreases toward the g1 engine rotational speed NEg1.

Since the speed reducing ratio of g1 is lower than that of g0, the load on the engine 10 at the time of acceleration in g1 tends to become greater than that in g0. Consequently, in the state where the force on the accelerator pedal is large, there is a case such that the g1 fuel injection amount FCg1 as a fuel injection amount in the case where the gear is g1 becomes larger than the g0 fuel injection amount FCg0 as a fuel injection amount in the case where the gear is g0. On the other hand, in the case where the force on the accelerator pedal is decreased, the power required for the engine 10 decreases, so that the fuel injection amount becomes an injection amount according to the engine rotational speed, and the engine rotational speed in the case of g1 becomes lower than that in the case of g0. In a state where the force on the accelerator pedal is small, g1 fuel injection amount FCg1 becomes lower than g0 fuel injection amount FCg0. Therefore, a fuel injection amount FCCE upon execution of gear shift as a fuel injection amount in the case of shifting the gear from g0 to g1 becomes the same as the g0 fuel injection amount FCg0 before gear shift and, after shift to g1, decreases toward the g1 fuel injection amount FCg1 and becomes the same as the g1 fuel injection amount FCg1. At this time, the fuel injection amount FCCE upon execution of gear shift gradually decreases toward the g1 fuel injection amount FCg1.

In the case of decreasing the force on the accelerator pedal and shifting the gear from g0 to g1, the driving force decreases, and the vehicle speed decreases. Accordingly, the engine rotational speed and the fuel injection amount also decrease. That is, when the vehicle speed decreases, the g1 engine rotational speed NEg1 decreases. Consequently, when the gear is shifted to g1, the engine rotational speed NECE upon execution of gear shift which becomes the same as the g1 engine rotational speed NEg1 also decreases. Similarly, when the vehicle speed decreases, the g1 fuel injection amount FCg1 decreases. Consequently, when the gear is shifted to g1, the fuel injection amount FCCE upon execution of gear shift which becomes the same as the g1 fuel injection amount FCg1 also decreases.

When the vehicle speed decreases and, accordingly, the engine rotational speed also decreases, in order to suppress that the engine rotational speed becomes too low, there is a case that it is determined to shift the gear from g1 to g0 as the original gear in a normal gear shift determination by the gear shift control unit 72. As described above, in the case where it is determined to shift the gear to g0, the gear shift control unit 72 shifts the gear from g1 to g0. That is, the second gear shift is executed.

In the case of shifting the gear from g1 to g0 as described above, the engine rotational speed becomes high, and the fuel injection amount increases. That is, in the case of shifting the gear from g1 to g0, the engine rotational speed NECE upon execution of gear shift becomes the same as the g0 engine rotational speed NEg0 higher than the g1 engine rotational speed NEg1, so that the engine rotational speed NECE upon execution of gear shift becomes high. Similarly, in the case of shifting the gear from g1 to g0, the fuel injection amount FCCE upon execution of gear shift becomes the same as the g0 fuel injection amount FCg0 larger than the g1 fuel injection amount FCg1, so that the fuel injection amount FCCE upon execution of gear shift increases.

In the case where the vehicle speed decreases by reducing the force on the accelerator pedal, the gear shift control unit 72 shifts the gear from g1 to g0. However, at the time of shifting the gear in such a manner, it takes predetermined time since start of the gear shift until completion of the gear shift. Specifically, in the case of shifting the gear, the friction element 40 corresponding to the gear g1 is disengaged and the friction element 40 corresponding to the gear g0 is engaged, thereby shifting the gear from g1 to g0. Consequently, in the case of shifting the gear, it takes time for the operation of switching the friction element 40. Consequently, T1 as a time point at which the gear shift from g1 to g0 is started and T2 as a time point at which the gear shift completes are apart from each other by predetermined time. This time is the time required at the time of shifting the gear or gear shift time as time during gear shift.

The engine rotational speed NECE upon execution of gear shift which becomes high in the case of shifting the gear from g1 to g0 starts increasing from T1 and becomes the same as the g0 engine rotational speed NEg0 at T2. On the other hand, the fuel injection amount FCCE upon execution of gear shift is larger than the g0 fuel injection amount FCg0 between T1 and T2. That is, at the time of shifting the gear, to reduce a shock caused by a sharp change in the power transmitted to the driving wheels, the ignition is retarded or the friction element 40 corresponding to the gear and a lockup clutch 28 provided for the torque converter 21 is made slipped, thereby suppressing a sharp change in the driving force. Due to this, the thermal efficiency and the power transmission efficiency decrease. To compensate the decreased amount, the fuel injection amount is increased. That is, between T1 and T2, the fuel injection amount FCCE upon execution of gear shift is increased more than the g0 fuel injection amount FCg0.

The difference between the fuel consumption in the case of maintaining the present gear g0 and that in the case of executing the first gear shift and the second gear shift when the force on the accelerator pedal is decreased is the difference between the g0 fuel injection amount FCg0 and the fuel injection amount FCCE upon execution of gear shift. In the case of performing the gear shift, the fuel injection amount is not switched to that for the gear after the gear shift at once but gradually changes. Consequently, the fuel injection amount FCCE upon execution of gear shift immediately after execution of the first gear shift is an injection amount obtained by adding a fuel injection amount FCJC upon change in the injection amount as the fuel injection amount which gradually changes to the g1 fuel injection amount FCg1 as the fuel injection amount of the gear at the time of normal gear shift determination.

Further, the fuel injection amount FCCE upon execution of gear shift in the case of executing the second gear shift is an injection amount obtained by adding a fuel injection amount FCED of an efficiency decrease amount as a fuel injection amount for compensating the decreased amount of the thermal efficiency and the transmission efficiency of the power to the g0 fuel injection amount FCg0. That is, the amount obtained by subtracting the fuel injection amount FCCE upon execution of the gear shift from the g0 fuel injection amount FCg0 is equal to the improved amount in fuel consumption achieved by the gear shift, and the fuel injection amount FCJC upon change in the injection amount and the fuel injection amount FCED of the efficiency decrease amount are the deteriorated amounts in fuel consumption accompanying the gear shift.

In the case where the fuel consumption determining unit 70 determines the fuel consumption, by comparing the second fuel consumption F2 as a fuel consumption in the case of injecting fuel with the fuel injection amount FCCE upon execution of gear shift for time since the present time point as the time point of executing the first gear shift until T2 and the first fuel consumption F1 as the fuel consumption in the case of injecting the fuel with the g0 fuel injection amount FCg0, the improved amount in fuel consumption achieved by the gear shift and the deteriorated amount in fuel consumption accompanying the gear shift are determined, thereby determining whether the gear shift is valid or not.

The case where g1 is a gear higher than g0 and down-shift is performed after up-shift is described. However, also in the case where g1 is a gear lower than g0 and up-shift is performed after down-shift, an improved amount in fuel consumption achieved by the gear shift and a deteriorated amount in fuel consumption accompanying the gear shift exist. Consequently, also in the case where the first gear shift is down-shift and the second gear shift is the up-shift when the first and second gear shifts are predicted, whether the gear shift is valid or not can be determined by using the fuel consumption.

Figure 5:
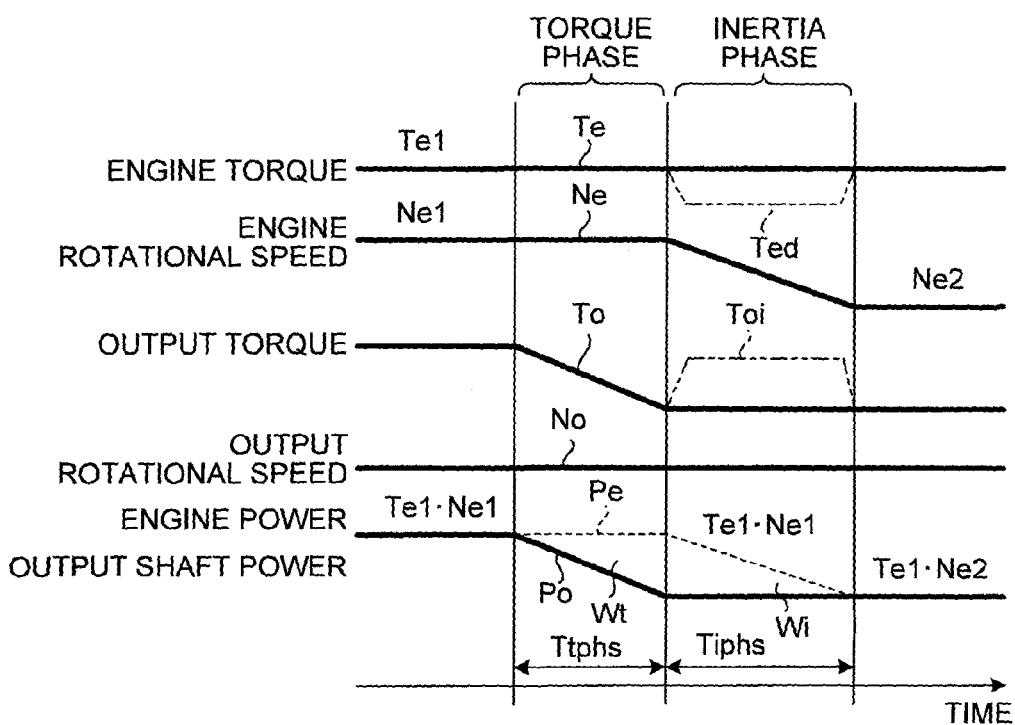
FIG. 5 is an explanatory diagram on a method of calculating deteriorated fuel consumption at the time of up-shift.

FIG. 5 is an explanatory diagram on a method of calculating a deteriorated amount in fuel consumption at the time of up-shift. When the first and second gear shifts are predicted, as described above, whether the gear shift is valid or not is determined on the basis of the improved amount in fuel consumption achieved by the gear shift and the deteriorated amount in fuel consumption accompanying the gear shift. Next, a method of calculating a deteriorated amount in fuel consumption accompanying the up-shift, that is, a method of calculating a deteriorated amount in fuel consumption at the time of up-shift will be described. In the following description, it is assumed that engine torque Te does not change at the time of the gear shift In the case of performing the up-shift, first, the friction element 40 corresponding to the gear before gear shift starts disengaging. In this case, since the load on the engine 10 does not change, the engine rotational speed Ne is maintained as constant rotational speed, and engine power Pe obtained by multiplying the engine rotational speed Ne and the constant engine torque Te also becomes constant.

In contrast, output torque To as torque output from the transmission output shaft 32 decreases due to decrease in the transmission efficiency accompanying the fact that the friction element 40 corresponding to the gear before gear shift starts disengaging. In this case, the vehicle speed does not change immediately before/after the gear shift, so that the output rotational speed No as the rotational speed of the transmission output shaft 32 maintains as constant rotational speed. Consequently, output shaft power Po obtained by multiplying the output torque To and the output rotational speed No decreases as the output torque To decreases.

As described above, a range in which the engine rotational speed Ne does not drop but the output torque To decreases at the time of an up-shift has a torque phase. In the torque phase, although the engine power Pe is constant, the output shaft power Po decreases, and the value obtained by subtracting the output shaft power Po from the engine power Pe corresponds to a lost power. As stated above, the power lost during the torque phase, that is, lost energy can be calculated by the following formula (1) where loss energy is Wt, time of torque phase is Ttphs, engine torque is Te1, engine rotational speed before the gear shift is Ne1, and the engine rotational speed after the gear shift is Ne2=Ne1 (gear ratio after gear shift)/(gear ratio before the gear shift).

$$Wt = Ttphs(Te1 \cdot Ne1 - Te1 \cdot Ne2)/2 \qquad (1)$$

The loss energy Wt calculated in such a manner is determined by the engine torque Te and the engine rotational speed Ne at the time of the gear shift, that is, the operating range of the engine 10. Consequently, in the case of obtaining the deteriorated amount in fuel consumption, an engine efficiency map as a map showing the relation between a fuel injection amount necessary to compensate the decreased amount of the operation efficiency due to the loss energy Wt and the operating range of the engine 10 is set in advance. The engine efficiency map is stored in the storage unit 80 in the ECU 60. By applying the operating range of the engine 10 to the engine efficiency map at the time of shifting the gear, a fuel injection amount Ft for compensating the loss energy Wt is calculated. The fuel injection amount Ft calculated as described above is a deteriorated amount in fuel consumption in the torque phase.

At the time of the up-shift, the friction element 40 corresponding to the gear after the gear shift starts engaging. In this case, the load on the engine 10 increases, so that the engine rotational speed Ne starts decreasing. Consequently, the engine power Pe obtained by multiplying the engine rotational speed Ne which starts decreasing by the constant engine torque Te also starts decreasing.

On the other hand, since the speed reducing ratio of the gear after the up-shift is lower than that of the gear before the shift, power is not transmitted in the gear before the gear shift because the friction element 40 corresponding to the gear before the gear shift is disengaged, and the output torque To output from the transmission output shaft 32 as the power is transmitted in the gear after the gear shift becomes constant in a state where it is lower than the output torque in the torque phase. Consequently, the output shaft power Po obtained by multiplying the output torque To which is constant in a low state by the output rotational speed No becomes constant in a state where it is lower than the output shaft power Po in the torque phase.

As described above, a range in which the engine rotational speed Ne decreases after the torque phase has an inertia phase. In the inertia phase, the engine power Pe is low, and the output shaft power Po is constant in a state where it is lower than the output shaft power Po in the torque phase. Also in the inertia phase, like in the torque phase, the value obtained by subtracting the output shaft power Po from the engine power Pe corresponds to a lost power, that is, lost energy. The energy lost in the inertia phase can be calculated by the following formula (2) where loss energy is Wi and time of the inertia phase is Tiphs.

$$Wi = Tiphs(Te1 \cdot Ne1 - Te1 \cdot Ne2)/2 \qquad (2)$$

In the case of obtaining a deteriorated amount in fuel consumption in the inertia phase, like in the case of obtaining the deteriorated amount in fuel consumption in the torque phase, an engine efficiency map is set and stored in the storage unit 80 in the ECU 60. By applying the operating range of the engine 10 to the engine efficiency map at the time of shifting the gear, a fuel injection amount Fi for compensating the loss energy Wi is calculated. The fuel injection amount Fi calculated as described above is the deteriorated amount in fuel consumption in the inertia phase. The deteriorated amount in fuel consumption at the time of the up-shift gear of once is obtained by totaling the fuel injection amount Ft in the torque phase and the fuel injection amount Fi in the inertial phase and calculating (Ft+Fi).

At the time of the up-shift, the output shaft power Po decreases first and the engine power Pe decreases later. Consequently, the difference becomes the loss energy and causes deterioration in the fuel consumption.

In the case where the engine rotational speed Ne decreases in the inertia phase, since the rotational speed decreases although the engine rotates, usually, the decreased amount is output and an increased amount Toi of the output torque To is generated. However, a sharp fluctuation in the output torque causes a gear shift shock. To lessen such a shock, at the time of gear shift, the ignition is retarded, and the engine torque Te is decreased. In the case where the engine rotational speed Ne decreases in the inertia phase, the torque output from the transmission output shaft 32 is cancelled out by the increased amount Toi of the output torque To caused by decrease in the rotational speed and a decreased amount Ted of the engine torque Te, and the output torque becomes constant. In the actual gear shift, such a control is performed. However, for convenience of explanation, FIG. 5 shows that the engine torque Te and the output torque To in the inertia phase are constant.

Figure 6:
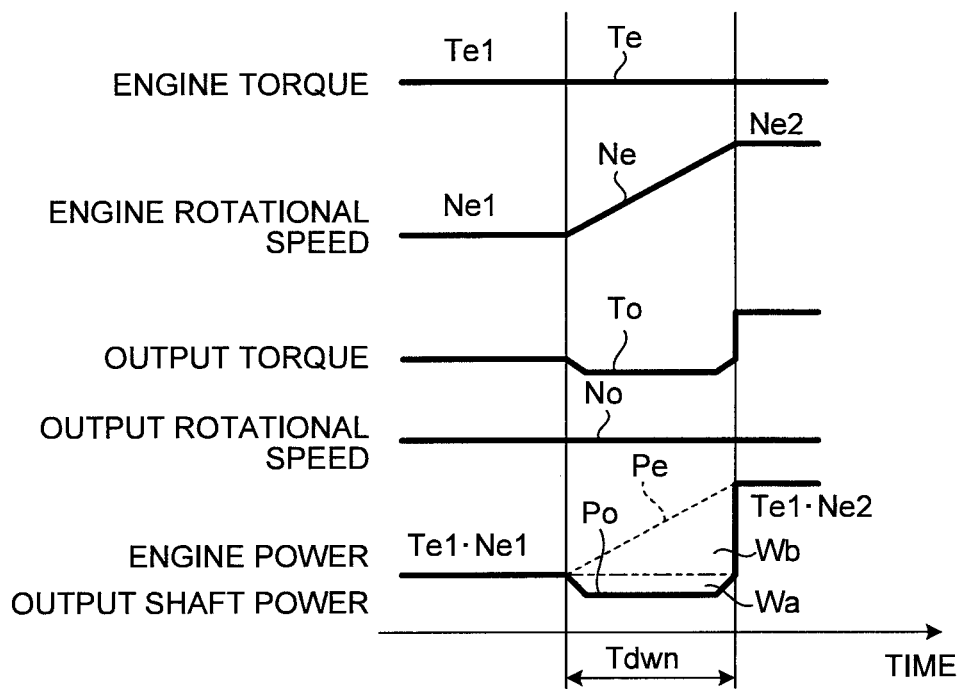
FIG. 6 is an explanatory diagram on a method of calculating deteriorated fuel consumption at the time of down-shift.

FIG. 6 is an explanatory diagram on a method of calculating a deteriorated amount in fuel consumption at the time of down-shift. Next, a method of calculating a deteriorated amount in fuel consumption accompanying the down-shift, that is, a deteriorated amount in fuel consumption at the time of down-shift will be described. Also in the following description, it is assumed that engine torque Te does not change at the time of the gear shift. Since the down-shift is performed while increasing the engine rotational speed Ne, the engine power Pe obtained by multiplying the engine rotational speed Ne which increases by the constant engine torque Te also increases at the time of the down-shift.

Since the engine rotational speed Ne increases at the time of the down-shift, a part of the engine power Pe during rise in the engine rotational speed Ne is used for increase in the engine rotational speed Ne. Specifically, since a part of the engine power Pe is used for increase in the rotational speed of a rotor, the output torque To as torque output from the transmission output shaft 32 decreases during the rise in the engine rotational speed Ne by an amount of the engine power Pe used for rise in the rotational speed of the rotor.

The output rotational speed No maintains as constant rotational speed like in the up-shift. However, the output torque To decreases during rise in the engine rotational speed Ne, so that the output shaft power Po obtained by multiplying the output torque To by the output rotational speed No decreases like the output torque To during the rise of the engine rotational speed Ne.

As described above, at the time of the down-shift, the output torque To decreases as the engine rotational speed Ne increases. The decreased amount in the output torque To to increase the engine rotational speed Ne becomes loss energy of the inertial torque amount of the engine 10 at the time of the down-shift. The loss energy corresponds to the increased amount in the inertia energy of the engine 10 accompanying a change in the engine rotational speed Ne. Consequently, in the case where the loss energy is expressed as Wa and the inertia energy of the engine 10 is set as Ie, the loss energy Wa can be calculated by the following formula (3).

$$Wa = Ie(Ne2^2 - Ne1^2)/2 \quad (3)$$

At the time of the down-shift, the output shaft power Po decreases as the inertia energy Ie of the engine 10 increases. During the down-shift, slippery of the friction element 40 occurs, so that the output shaft power Po becomes lower than the engine power Pe regardless of a change in the inertia energy Ie of the engine 10. The loss energy caused by the slippery of the friction element 40 becomes the difference between the engine power Pe and the output shaft power Po in the case where the decrease amount by the inertia energy Ie of the engine 10 is not considered. Consequently, in the case where the energy loss due to slippery of the friction element 40 is expressed as Wb and a gear shift time of the down-shift is expressed as Tdwn, the loss energy Wb can be calculated by the following formula (4).

$$Wb = (Ne2 - Ne1)Te1 \cdot Tdwn/2 \quad (4)$$

Consequently, the entire loss energy at the time of performing the down-shift can be calculated by Wa+Wb. In the case of obtaining the deteriorated amount in fuel consumption at the time of the down-shift, like in the case of obtaining the deteriorated amount in fuel consumption at the time of the up-shift, an engine efficiency map is set and stored in the storage unit 80 in the ECU 60. By applying the operating range of the engine 10 to the engine efficiency map at the time of shifting the gear, a fuel injection amount for compensating the loss energy (Wa+Wb) is calculated. The fuel injection amount calculated as described above is a deteriorated amount in fuel consumption at the time of the down-shift.

Ttphs, Tiphs, and Tdwn as time used to calculate the deteriorated amount in fuel consumption at the time of the up-shift or down-shift are preliminarily stored in the storage unit 80 in the ECU 60 by each of gears at the time of gear shifts. The fuel consumption at the time of gear shift is estimated by the fuel consumption estimating unit by applying the engine torque Te assumed from the engine rotational speed obtained by the engine rotational speed obtaining unit 63, the accelerator position obtained by the accelerator position obtaining unit 62, and the like to the engine efficiency map which is set on the basis of the formulae at the time of the gear shifts.

In the above-described gear shift control apparatus 1, when there is the determination of gear shift in the automatic transmission 20, gear shift completion time as time since the present gear is shifted to another gear and, after that, further shifted to the present gear is estimated by the gear shift time estimating unit 67. The first fuel consumption F1 as a fuel consumption in the case where the vehicle drives for the gear shift completion time in the present gear without shifting the present gear and the second fuel consumption F2 as a fuel consumption in the case where, during travel of the vehicle, the present gear is shifted to another gear at the time of the gear shift determination and, after that, further shifted to the present gear are estimated by the fuel consumption estimating unit 69. In the case where it is determined that the second fuel consumption F2 is larger than the first fuel consumption F1 by a predetermined margin or more, the gear shift control unit 72 for performing the gear shift control inhibits shift to another gear at the time of the gear shift determination and performs the gear shift control.

In the case where there is the possibility that after the shift to another gear, the gear is shifted again to the present gear and deterioration in the fuel consumption by performing the gear shift is estimated, the gear shift is not performed. Consequently, deterioration in the fuel consumption accompanying the gear shift can be suppressed. Even when there is the gear shift determination, by inhibiting the gear shift on the basis of the fuel consumption, the number of gear shifts can be decreased. As a result, both of improvement in fuel consumption and suppression of frequent gear shifts can be satisfied more reliably. Since the frequent gear shifts can be suppressed, the number of gear shift shocks can be reduced, and the drivability can be improved.

Since there is the reset prediction determining unit 66 for making a determination that, in the case where there is the gear shift determination, whether it is predicted to perform the shift from the present gear to another gear and, after that, further shifted to the present gear on the basis of the driving conditions of the vehicle, the gear shift state when there is the gear shift determination can be determined more reliably. Consequently, when it is predicted that, even when there is a gear shift determination, the gear shift is not performed but such a gear shift is made, the gear shift completion time is estimated by the gear shift time estimating unit 67 and the first and second fuel consumptions F1 and F2 are estimated by the fuel consumption estimating unit 69. In such a manner, when the gear shift control is performed by the gear shift control unit 72, whether the gear is shifted or not can be switched on the basis of the fuel consumption. As a result, both improvement in fuel consumption and suppression of frequent gear shifts can be satisfied more reliably.

Since the gear shift completion time is estimated by the gear shift time estimating unit 67 by adding the time required to shift the gear to time in the case of performing driving in another gear at the time of the gear shift determination, the gear shift completion time can be estimated more accurately. Accordingly, the first and second fuel consumptions F1 and F2 can be estimated more accurately in the fuel consumption estimating unit 69. At the time of making the determination of whether or not the gear shift is performed on the basis of the fuel consumption, while reducing the number of gear shift times more reliably, the gear shift control which is advantageous from the viewpoint of fuel consumption can be performed. As a result, both improvement in fuel consumption and suppression of frequent gear shifts can be satisfied more reliably.

Since the second fuel consumption F2 is estimated by the fuel consumption estimating unit 69 by adding the fuel consumption at the time of the gear shift to the fuel consumption in the case of performing driving in the shifted gear, the second fuel consumption F2 can be estimated more accurately. Accordingly, at the time of making the determination of whether or not the gear shift is performed on the basis of the fuel consumption, while reducing the number of gear shift times more reliably, the gear shift control which is advantageous from the viewpoint of fuel consumption can be performed. As a result, both improvement in fuel consumption and suppression of frequent gear shifts can be satisfied more reliably.

In the case of comparing the first and second fuel consumptions F1 and F2 and determining whether the first and second gear shifts are performed or not on the basis of the fuel consumption, the determination is not performed only by the relative relation between the first and second fuel consumptions F1 and F2 but the first and second gear shifts are executed in the case where the result obtained by subtracting the first fuel consumption F1 from the second fuel consumption F2 is less than the margin. In other words, when the fuel consumption obtained by adding the margin to the first fuel consumption F1 as a fuel consumption in the case where the gear shift is not performed is larger than the second fuel consumption F2 as a fuel consumption in the case of executing the first and second gear shifts, the first and second gear shifts are executed. In the case where the second fuel consumption F2 is equal to or larger than the fuel consumption obtained by adding the margin to the first fuel consumption F1, the first and second gear shifts are not executed. That is, the margin is set as an improved amount in the fuel consumption by performing the first and second gear shifts. When the fuel consumption is not improved more than the improved amount in the case where the gear shift is not performed, the first and second gear shifts are not executed. Therefore, the number of gear shifts can be reduced more reliably, and the fuel consumption can be improved. As a result, both improvement in fuel consumption and suppression of frequent gear shifts can be satisfied more reliably.

Figure 7:
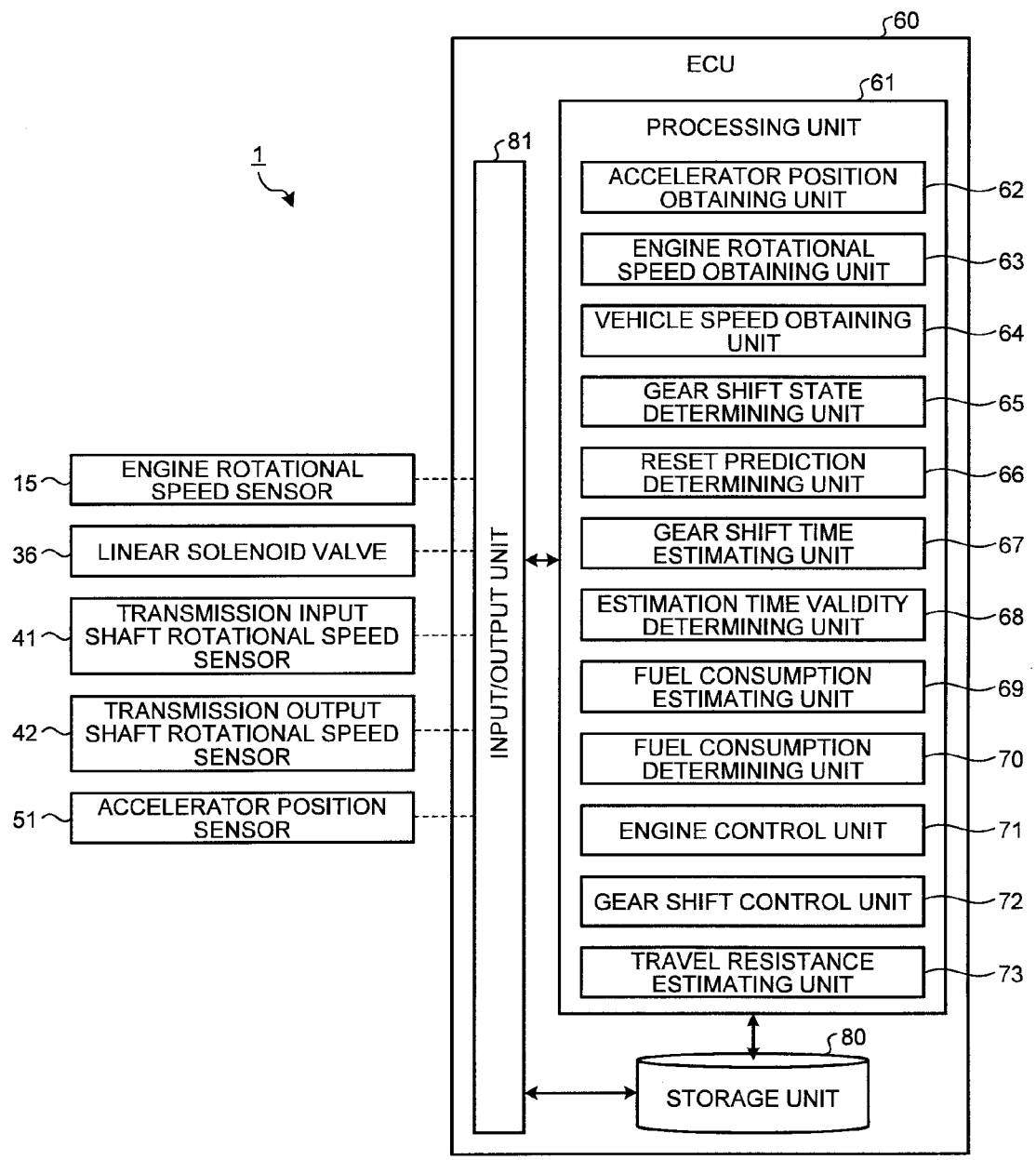
FIG. 7 is a configuration diagram of a main part of a gear shift control apparatus for an automatic transmission according to a modification of the invention.

FIG. 7 is a configuration diagram of a main part of a gear shift control apparatus for an automatic transmission according to a modification of the present invention. In the gear shift control apparatus 1 of the automatic transmission 20 according to the embodiment, the gear shift time estimating unit 67 estimates the gear shift completion time on the basis of the accelerator position and the vehicle speed. The gear shift completion time may be estimated on the basis of driving conditions other than the above or including the other driving conditions. For example, the gear shift time estimating unit 67 may estimate the gear shift completion time in consideration of travel resistance at the time of travel of the vehicle. In this case, as shown in FIG. 7, the processing unit 61 in the ECU 60 is provided with a travel resistance estimating unit 73 as travel resistance estimating means for estimating travel resistance at the time of travel of the vehicle.

The travel resistance estimating unit 73 provided in such a manner uses, as travel resistances at the time of travel of the vehicle, for example, inclination information of a road on which the vehicle travels, an estimated value of weight of the vehicle, the relation between an output driving force and vehicle speed, and the like. Among them, the road inclination information is obtained by the travel resistance estimating unit 73 from, for example, map information of a car navigation system (not shown) mounted on the vehicle and an inclination sensor (not shown) for detecting inclination of a road by detecting acceleration acting on the vehicle and the inclination of the vehicle. The weight of the vehicle is estimated by estimating the driving force at the time of travel on the basis of the accelerator position, the vehicle speed, the speed reducing ratio in the selected gear, and the like and by estimating the weight of the vehicle by the travel resistance estimating unit 73 on the basis of the estimated driving force and the detection result in an accelerator sensor (not shown) for detecting acceleration. Since the resistance at the time of travel of the vehicle varies according to the inclination of the road and the weight of the vehicle, the resistance is estimated by the travel resistance estimating unit 73 on the basis of values obtained and estimated.

The travel resistance at the time of travel of the vehicle can be estimated from the relation between the driving force generated in the driving wheels and the vehicle speed estimated on the basis of the accelerator position and the like even if the conditions in the travel of the vehicle such as the inclination of the road and the vehicle weight are not known. Consequently, even in the case where the inclination of a road and the like are not known, the travel resistance estimating unit 73 estimates the travel resistance on the basis of the relation between the driving force generated in the driving wheels and the vehicle speed. The travel resistances are estimated by a detection result of the accelerator position and the like and the map used at the time of estimating the travel resistance. The map is preliminarily set and stored in the storage unit 80 in the ECU 60.

At the time of estimating the gear shift completion time (refer to step ST103 in FIG. 3), the gear shift time estimating unit 67 estimates the gear shift completion time not only from the accelerator position and the vehicle speed but also from the travel resistance estimated in the travel resistance estimating unit 73. That is, the gear shift time estimating unit 67 calculates acceleration after shift from g0 to g1 using the accelerator position obtained by the accelerator position obtaining unit 62, the vehicle speed obtained by the vehicle speed obtaining unit 64 and, further, the travel resistance estimated by the travel resistance estimating unit 73, calculates required time to reach the timing of shift to g0 in the case where the vehicle travels at the calculated acceleration, and adds the time required for the shift itself from g1 to g0 to the calculated required time, thereby estimating the gear shift completion time.

As described above, by providing the processing unit 61 in the ECU 60 with the travel resistance estimating unit 73 for estimating the travel resistance at the time of travel of the vehicle and estimating the gear shift completion time in the gear shift time estimating unit 67 in consideration of the travel resistance estimated by the travel resistance estimating unit 73, the gear shift completion time can be estimated more accurately. That is, the acceleration of the vehicle changes according to the travel resistance even in the case where the accelerator position, the vehicle speed, and the gear shift are the same, and the acceleration toward the travel direction tends to decrease as the travel resistance increases. In the case where the acceleration changes, time of the vehicle speed to reach the target vehicle speed also changes. Consequently, by estimating the gear shift completion time in consideration of the travel resistance, the time can be estimated more accurately.

Although the fuel consumption estimating unit 69 estimates the first and second fuel consumption F1 and F2 on the basis of the gear shift completion time estimated by the gear shift time estimating unit 67, by estimating the gear shift completion time more accurately, the fuel consumption estimating unit 69 can estimate the fuel consumptions more accurately. The more advantageous case from the viewpoint of fuel consumption, which is the case where the present gear is maintained or the case where the first and second gear shifts are performed, can be determined on the basis of the fuel consumption more accurately. Consequently, when the gear shift determination is made, it is predicted that the present gear g0 is shifted to another gear g1 and, after that, shifted to the present gear g0, and which one of the gear shift or maintaining of the present gear g0 is performed, the gear shift control using a smaller fuel consumption can be performed more reliably. As a result, both improvement in fuel consumption and suppression of frequent gear shifts can be satisfied more reliably.

INDUSTRIAL APPLICABILITY

As described above, the gear shift control apparatus for an automatic transmission and the gear shift control method for an automatic transmission according to the invention are useful as a gear shift control apparatus for controlling shift of a gear and, particularly suitable to the case where attention is paid to fuel consumption as a criterion of gear shift.

REFERENCE SINGS LIST

1 GEAR SHIFT CONTROL APPARATUS
10 ENGINE
20 AUTOMATIC TRANSMISSION
21 TORQUE CONVERTER
30 TRANSMISSION
50 ACCELERATOR PEDAL
60 ECU
61 PROCESSING UNIT
62 ACCELERATOR POSITION OBTAINING UNIT
63 ENGINE ROTATIONAL SPEED OBTAINING UNIT
64 VEHICLE SPEED OBTAINING UNIT
65 GEAR SHIFT STATE DETERMINING UNIT
66 RESET PREDICTION DETERMINING UNIT
67 GEAR SHIFT TIME ESTIMATING UNIT
68 ESTIMATION TIME VALIDITY DETERMINING UNIT
69 FUEL CONSUMPTION ESTIMATING UNIT
70 FUEL CONSUMPTION DETERMINING UNIT
71 ENGINE CONTROL UNIT
72 GEAR SHIFT CONTROL UNIT
73 TRAVEL RESISTANCE ESTIMATING UNIT
80 STORAGE UNIT
81 INPUT/OUTPUT UNIT

The invention claimed is:

1. A gear shift control apparatus for an automatic transmission, performing gear shift control on an automatic transmission provided so as to be able to output power of an engine as a power source at the time of driving of a vehicle to a driving wheel side and having a plurality of gears in which rotational speed of the power can be shifted, comprising:
 a gear shift control unit, in the case where a target gear as a gear which becomes a target at the time of performing the gear shift control is not a present gear, for controlling a gear shift by making a gear shift determination of shifting the gear from the present gear to another gear;
 a gear shift state determining unit for determining the presence or absence of the gear shift determination;
 a gear shift time estimating unit, in the case where there is the gear shift determination, for estimating gear shift completion time as time after the gear is shifted from the present gear to the another gear until the gear is further shifted to the present gear;
 a fuel consumption estimating unit for estimating a first fuel consumption as a fuel consumption of the engine in the case where the vehicle travels for the gear shift completion time at the present gear without shifting the present gear and a second fuel consumption as a fuel consumption of the engine in the case where the gear is shifted from the present gear to the another gear and, further, shifted to the present gear; and
 a fuel consumption determining unit for determining validity of gear shift on the basis of the first and second fuel consumptions,
 wherein the gear shift control unit changes a determination of shifting the gear to the another gear at the time of the gear shift determination in accordance with a determination result of the fuel consumption determining unit.

2. The gear shift control apparatus for an automatic transmission according to claim 1, wherein in the case where the fuel consumption determining unit determines that the second fuel consumption is larger than the first fuel consumption by a predetermined amount or larger, the gear shift control unit changes a determination of shifting the gear to the another gear at the time of the gear shift determination.

3. The gear shift control apparatus for an automatic transmission according to claim 1, further comprising a reset prediction determining unit, in the case where there is the gear shift determination, for making a determination of whether it is predicted that the present gear is shifted to the another gear and, after that, further shifted to the present gear or not on the basis of driving conditions of the vehicle,
 wherein in the case where the reset prediction determining unit determines that it is predicted that the present gear is shifted to the another gear and, after that, further shifted to the present gear, the gear shift time estimating unit estimates the gear shift completion time.

4. The gear shift control apparatus for an automatic transmission according to claim 1, wherein the gear shift time estimating unit estimates the gear shift completion time by adding time required to shift the gear to time in the case where the vehicle travels in the another gear at the time of the gear shift determination.

5. The gear shift control apparatus for an automatic transmission according to claim 1, wherein the fuel consumption estimating unit estimates the second fuel consumption by adding a fuel consumption at the time of shifting the gear to a fuel consumption in the case where the vehicle travels in the shifted gear.

6. The gear shift control apparatus for an automatic transmission according to claim 1, wherein the gear shift time estimating unit estimates the gear shift completion time in consideration of travel resistance when the vehicle travels.

7. The gear shift control method for an automatic transmission according to claim 1, wherein in the case where it is determined in the fuel consumption determining step that the second fuel consumption is larger than the first fuel consumption by a predetermined amount or more, a determination of shifting the gear to the another gear at the time of the gear shift determination is changed.

8. The gear shift control apparatus for an automatic transmission according to claim 2, wherein the gear shift time estimating unit estimates the gear shift completion time in consideration of travel resistance when the vehicle travels.

9. The gear shift control apparatus for an automatic transmission according to claim 3, wherein the gear shift time estimating unit estimates the gear shift completion time in consideration of travel resistance when the vehicle travels.

10. The gear shift control apparatus for an automatic transmission according to claim 4, wherein the gear shift time estimating unit estimates the gear shift completion time in consideration of travel resistance when the vehicle travels.

11. The gear shift control apparatus for an automatic transmission according to claim 5, wherein the gear shift time estimating unit estimates the gear shift completion time in consideration of travel resistance when the vehicle travels.

12. The gear shift control method for an automatic transmission according to claim 11, wherein in the gear shift time estimating step, the gear shift completion time is estimated in consideration of travel resistance when the vehicle travels.

13. A gear shift control method for an automatic transmission, performing gear shift control on an automatic transmission provided so as to be able to output power of an engine as a power source at the time of driving of a vehicle to a driving wheel side and having a plurality of gears in which rotational speed of the power can be shifted, comprising:
 a gear shift state determining step, in the case where a target gear as a gear which becomes a target at the time of performing the gear shift control is not a present gear, of determining the presence or absence of the gear shift determination as a determination of shifting the gear from the present gear to the another gear;

a gear shift time estimating step, in the case where there is the gear shift determination, of estimating gear shift completion time as time after the gear is shifted from the present gear to the another gear until the gear is further shifted to the present gear;

a fuel consumption estimating step of estimating a first fuel consumption as a fuel consumption of the engine in the case where the vehicle travels for the gear shift completion time at the present gear without shifting the present gear and a second fuel consumption as a fuel consumption of the engine in the case where the gear is shifted from the present gear to the another gear and, further, shifted to the present gear; and a fuel consumption determining step of determining validity of gear shift on the basis of the first and second fuel consumptions, wherein a determination of shifting the gear to the another gear at the time of the gear shift determination is changed in accordance with a determination result of the fuel consumption determining step.

14. The gear shift control method for an automatic transmission according to claim 13, further comprising a reset prediction determining step, in the case where there is the gear shift determination, of making a determination of whether it is predicted that the present gear is shifted to the another gear and, after that, further shifted to the present gear or not on the basis of driving conditions of the vehicle, wherein in the case where it is determined in the reset prediction determining step that it is predicted that the present gear is shifted to the another gear and, after that, further shifted to the present gear, the gear shift completion time is estimated in the gear shift time estimating step.

15. The gear shift control method for an automatic transmission according to claim 13, wherein in the case of estimating the gear shift completion time in the gear shift time estimating step, the gear shift completion time is estimated by adding time required to shift the gear to time in the case where the vehicle travels in the another gear at the time of the gear shift determination.

16. The gear shift control method for an automatic transmission according to claim 13, wherein the second fuel consumption is estimated in the fuel consumption estimating step by adding a fuel consumption at the time of shifting the gear to a fuel consumption in the case where the vehicle travels in the shifted gear.

17. The gear shift control method for an automatic transmission according to claim 13, wherein in the gear shift time estimating step, the gear shift completion time is estimated in consideration of travel resistance when the vehicle travels.

18. The gear shift control method for an automatic transmission according to claim 14, wherein in the gear shift time estimating step, the gear shift completion time is estimated in consideration of travel resistance when the vehicle travels.

19. The gear shift control method for an automatic transmission according to claim 15, wherein in the gear shift time estimating step, the gear shift completion time is estimated in consideration of travel resistance when the vehicle travels.

20. The gear shift control method for an automatic transmission according to claim 16, wherein in the gear shift time estimating step, the gear shift completion time is estimated in consideration of travel resistance when the vehicle travels.

* * * * *